United States Patent
Fan et al.

(10) Patent No.: US 12,058,579 B2
(45) Date of Patent: Aug. 6, 2024

(54) CELL RESELECTION METHOD AND APPARATUS BASED ON SLICE, AND DEVICE AND STORAGE MEDIUM

(71) Applicant: GUANGDONG OPPO MOBILE TELECOMMUNICATIONS CORP., LTD., Dongguan (CN)

(72) Inventors: Jiangsheng Fan, Dongguan (CN); Zhe Fu, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

(21) Appl. No.: 18/244,554

(22) Filed: Sep. 11, 2023

(65) Prior Publication Data

US 2023/0422122 A1    Dec. 28, 2023

Related U.S. Application Data

(63) Continuation of application No. PCT/CN2021/092287, filed on May 8, 2021.

(51) Int. Cl.
*H04W 36/08* (2009.01)
*H04W 36/00* (2009.01)

(52) U.S. Cl.
CPC ....... *H04W 36/08* (2013.01); *H04W 36/0061* (2013.01)

(58) Field of Classification Search
CPC .............. H04W 36/08; H04W 36/0061; H04W 36/083; H04W 36/085; H04W 36/087; H04W 36/13
See application file for complete search history.

(56) References Cited

U.S. PATENT DOCUMENTS

| | | | |
|---|---|---|---|
| 2023/0037553 A1* | 2/2023 | Shih | H04W 36/00835 |
| 2023/0156583 A1* | 5/2023 | Murray | H04W 48/20 370/329 |

FOREIGN PATENT DOCUMENTS

| | | | |
|---|---|---|---|
| CN | 109246775 A | 1/2019 | |
| CN | 107223350 B | 3/2020 | |
| CN | 111386727 A | 7/2020 | |
| CN | 112425205 A | 2/2021 | |
| EP | 3627863 A1 | 3/2020 | |

(Continued)

OTHER PUBLICATIONS

WO-2022176098-A1 (Google Patents English Translated) (Year: 2022).*

(Continued)

*Primary Examiner* — Chi H Pham
*Assistant Examiner* — Ji-Hae Yea
(74) *Attorney, Agent, or Firm* — BAYES PLLC

(57) ABSTRACT

Provided in the present application are a cell reselection method and apparatus based on a slice, and a device and a storage medium. The method comprises: a network device transmitting, to a terminal device, slice-related information that is associated with a serving cell frequency point and/or slice information that is associated with at least one neighboring cell frequency point; and the terminal device determining a final target reselected cell on the basis of the slice-related information that is associated with the serving cell frequency point and/or the slice information that is associated with the at least one neighboring cell frequency point.

5 Claims, 4 Drawing Sheets

(56) References Cited

FOREIGN PATENT DOCUMENTS

| | | |
|---|---|---|
| EP | 4096292 A1 | 11/2022 |
| WO | 2017140342 A1 | 8/2017 |
| WO | 2017157118 A1 | 9/2017 |
| WO | 2021049993 A1 | 3/2021 |
| WO | WO-2022176098 A1 * | 8/2022 |

OTHER PUBLICATIONS

3GPP TSG-RAN2 #113bis-e; R2-2103621; Electronic meeting, Apr. 12-20, 2021; Agenda item: 8.8.2; Source: LG Electronics Inc.; Title: Discussion on slice based cell reselection.
3GPP TSG RAN WG2 Meeting #113bis-e; R2-2102696; E-Conference, Apr. 12-20, 2021; Agenda item: 8.8.2 Source: Qualcomm Incorporated; Title: Slice specific cell reselection; WID/SID: FS_NR_slice-Release 17.
International Search Report issued in International application No. PCT/CN2021/092287, mailed Jan. 21, 2022.
Written Opinion of the International Searching Authority issued in International application No. PCT/CN2021/092287, mailed Jan. 21, 2022.
3GPP TS 38.304 V16.3.0 (Dec. 2020); Technical Specification Group Radio Access Network; NR; User Equipment (UE) procedures in Idle mode and RRC Inactive state (Release 16).
3GPP TS 38.331 V16.3.1 (Jan. 2021); Technical Specification Group Radio Access Network; NR; Radio Resource Control (RRC) protocol specification (Release 16).
3GPP TSG-RAN WG2 Meeting #113 electronic; R2-2101974; Online, Jan. 25-Feb. 5, 2021; Agenda Item: 8.8.2 Slice based cell reselection under network control; Source: Huawei (Email rapporteur); Title: Report of email 251 for slice-based cell (re)selection; WI code(s): FS_NR_slice.
3GPP TSG-RAN WG2 Meeting#113; R2-2101194; Electronic, Jan. 25-Feb. 5, 2021; Source: ZTE Corporation, Sanechips; Title: Consideration on slice specific cell selection and reselection.
3GPP TS 23.501 V16.8.0 (Mar. 2021); Technical Specification Group Services and System Aspects; System architecture for the 5G System (5GS); Stage 2 (Release 16).
3GPP TSG-RAN WG2 Meeting#113bis-e; R2-2104063; Electronic, Apr. 12-20, 2021; Source: ZTE Corporation, Sanechips; Title: Discussion on slice-aware cell reselection.
3GPP TSG-RAN WG2 #113-e; R2-2100894; E-meeting, Jan. 2021; Agenda Item: 8.8.2; Source: OPPO; Title: Consideration on slice-specific cell (re)selection.
Extended European Search Report issued in corresponding European application No. 21941036.2, mailed Mar. 6, 2024.

* cited by examiner

CELL RESELECTION METHOD AND APPARATUS BASED ON SLICE, AND DEVICE AND STORAGE MEDIUM

CROSS-REFERENCE TO RELATED APPLICATION

The present application is a continuation application of International Application No. PCT/CN2021/092287, filed on May 8, 2021, and the entire contents thereof are incorporated herein by reference.

TECHNICAL FIELD

The embodiments of the present application relate to communication technologies, and in particular to a slice-based cell reselection method, apparatus, device, and storage medium.

BACKGROUND

Nowadays, with people's pursuit of speed, delay, high-speed mobility, energy efficiency and the diversity and complexity of services in future life, the 3rd Generation Partnership Project (3GPP) international standards organization has started the research and development of the fifth generation of mobile communications (Fifth Generation, 5G). The main application scenarios of 5G are: Enhanced Mobile Broadband (eMBB), Ultra Reliable Low Latency Communications (URLLC), and massive Machine Type Communications (mMTC).

In the specific implementation of any of the above application scenarios, the terminal device can perform cell selection or reselection according to location movement or service requirements, and the network device can also configure frequency point priority information while configuring frequency points. In the prior art, when a terminal device performs cell selection/reselection, if the cell selected by the terminal device satisfies a suitable cell criterion (S criterion), the terminal can choose to camp in the cell to complete the cell selection. The target cell for reselection satisfies the appropriate cell criterion and satisfies the reselection criterion condition defined based on the absolute frequency point priority, then the terminal reselects to the corresponding cell that meets the foregoing conditions, and completes cell reselection.

SUMMARY

The embodiments of the present application provide a slice-based cell reselection method, apparatus, device, and storage medium.

In the first aspect, the embodiment of the present application may provide a slice-based cell reselection method, which is applied to a terminal device, and the method includes:
  receiving slice-related information associated with a serving cell frequency point and/or slice-related information associated with at least one neighboring cell frequency point sent by a network device; and
  determining a target cell for reselection according to the slice-related information associated with the serving cell frequency point and/or the slice-related information associated with the at least one neighboring cell frequency point.

In the second aspect, the embodiment of the present application may provide a slice-based cell reselection method, which is applied to a network device, and the method includes:
  sending, to a terminal device, slice-related information associated with a serving cell frequency point and/or slice-related information associated with at least one neighboring cell frequency point of the terminal device.

In the third aspect, the embodiment of the present application may provide a slice-based cell reselection apparatus, including:
  a receiving module, configured to receive slice-related information associated with a serving cell frequency point and/or slice-related information associated with at least one neighboring cell frequency point sent by a network device; and
  a processing module, configured to determine a target cell for reselection according to the slice-related information associated with the serving cell frequency point and/or the slice-related information associated with the at least one neighboring cell frequency point.

In a fourth aspect, the embodiment of the present application may provide a slice-based cell reselection apparatus, including:
  sending module, configured to send, to a terminal device, slice-related information associated with a serving cell frequency point and/or slice-related information associated with at least one neighboring cell frequency point of the terminal device.

In the fifth aspect, the embodiment of the present application may provide a terminal device, including:
  a processor, a memory, and an interactive interface;
  wherein the memory stores computer-executable instructions; and
  the processor executes the computer-executable instructions stored in the memory, to cause the processor to execute the slice-based cell reselection method described in the first aspect.

In the sixth aspect, the embodiment of the present application may provide a network device, including:
  a processor, a memory, and an interactive interface;
  wherein the memory stores computer-executable instructions; and
  the processor executes the computer-executable instructions stored in the memory, to cause the processor to execute the slice-based cell reselection method described in the second aspect.

In the seventh aspect, the embodiments of the present application may provide a computer-readable storage medium, wherein computer-executable instructions are stored in the computer-readable storage medium, and when the computer-executable instructions are executed by a processor, the slice-based cell reselection method in the first aspect is implemented.

In the eighth aspect, the embodiments of the present application may provide a computer-readable storage medium, wherein computer-executable instructions are stored in the computer-readable storage medium, and when the computer-executable instructions are executed by a processor, the slice-based cell reselection method in the second aspect is implemented.

In the ninth aspect, the embodiment of the present application may provide a chip, including: a processing module and a communication interface, wherein the processing module is configured to execute the slice-based cell reselection method described in the first aspect.

In the tenth aspect, the embodiment of the present application may provide a chip, including: a processing module and a communication interface, wherein the processing module is configured to execute the slice-based cell reselection method described in the second aspect.

In the eleventh aspect, the embodiment of the present application may provide a computer program product, including a computer program, and when the computer program is executed by a processor, the slice-based cell reselection method described in the first aspect is implemented.

In the twelfth aspect, an embodiment of the present application may provide a computer program product, including a computer program, and when the computer program is executed by a processor, the slice-based cell reselection method described in the second aspect is implemented.

BRIEF DESCRIPTION OF THE DRAWINGS

In order to more clearly illustrate the technical implementations in the embodiments of the present application or the prior art, the following will briefly introduce the drawings that need to be used in the description of the embodiments or the prior art. Apparently, the described embodiments are some of the embodiments of the present application, but not all embodiments. Based on the embodiments in this application, all other implementations obtained by persons of ordinary skill in the art without making creative efforts belong to the scope of protection of this application.

DETAILED DESCRIPTION

Figure 1:
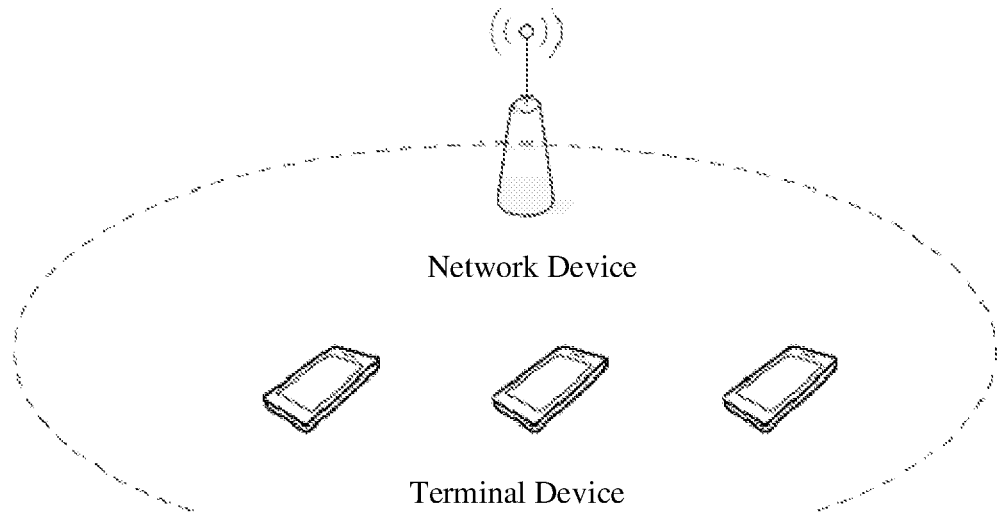
FIG. 1 is a schematic diagram of an application scenario of a slice-based cell reselection method provided by the present application.

In order to make the purposes, technical solutions and advantages of the embodiments of the present application clearer, the technical solutions in the embodiments of the present application will be clearly and completely described below in conjunction with the drawings in the embodiments of the present application. Obviously, the described embodiments are a part of the embodiments of this application, not all of them. Based on the embodiments in this application, all other embodiments obtained by those of ordinary skill in the art without making creative efforts belong to the scope of protection of this application.

The terms "first", "second" and the like in the description, claims, and above-mentioned drawings of the embodiments of the present application are used to distinguish similar objects, and are not necessarily used to describe a specific sequence or order. It is to be understood that the number so used are interchangeable under appropriate circumstances such that the embodiments of the application described herein, for example, can be practiced in sequences other than those illustrated or described herein. Furthermore, the terms "comprising" and "having", as well as any variations thereof, are intended to cover a non-exclusive inclusion, for example, a process, method, system, product or device comprising a sequence of steps or elements is not necessarily limited to the expressly listed instead, may include other steps or elements not explicitly listed or inherent to the process, method, product or apparatus.

In the current existing technology, the main application scenarios of the fifth generation mobile communication (Fifth Generation, 5G) are: Enhanced Mobile Broadband (eMBB), Ultra Reliable Low Latency Communications (URLLC), massive Machine Type Communications (mMTC).

The eMBB still aims at users' access to multimedia content, services and data, and its demand is growing rapidly. On the other hand, since the eMBB may be deployed in different scenarios, such as indoors, urban areas, and rural areas, the capabilities and requirements vary greatly, so it cannot be generalized and must be analyzed in detail in combination with specific deployment scenarios. Typical applications of the URLLC include: industrial automation, power automation, telemedicine operations (surgery), traffic safety assurance, etc. The typical characteristics of the mMTC include: high connection density, small data volume, delay-insensitive services, low cost and long service life of modules, etc.

In order to reduce air interface signaling and quickly restore wireless connections and data services in the 5G network environment, a new radio resource control (RRC) state is defined, namely the RRC_INACTIVE state. This state is different from the RRC_IDLE and RRC_CONNECTED states.

Idle state (RRC_IDLE): Mobility is based on user equipment (UE) cell selection and reselection, paging is initiated by CN, and the paging area is configured by CN. There is no UE AS context on the base station side. There is no RRC connection.

Connected state (RRC_CONNECTED): There is an RRC connection, and the UE AS context exists between the base station and the UE. The network side knows the location of the UE at the specific cell level. Mobility is mobility controlled by the network side. Unicast data can be transmitted between the UE and the base station.

Inactive state (RRC_INACTIVE): Mobility is UE-based cell selection and reselection, there is a connection between CN-NG-RAN, the UE AS context exists on a certain base station, and paging is triggered by the radio access network (RAN), the RAN-based paging area is managed by the RAN, and the network side knows the location of the UE based on the RAN-based paging area level.

Frequency Point Priority

When a network device configures a frequency point, it can configure the frequency point priority information at the same time. The frequency point priority can also be referred to as the absolute frequency point priority. The absolute frequency point priority values are 0, 1, 2, 3, 4, 5, 6 or 7, 0 represents the lowest priority, and 7 represents the highest priority. For the diversity of frequency point priority configuration, the standard stipulates that each value of 0-7 can be associated with a decimal value, and the range of the decimal value is {0.2, 0.4, 0.6, 0.8}. There are 40 absolute frequency point priority combinations in total with the combination of the integer and decimal places.

The absolute frequency point priority can be configured through system information or dedicated signaling. The frequency point priority configured by dedicated signaling will be associated with an effective duration. Within the effective duration, the dedicated frequency point priority always covers the public frequency point priority broadcasted by the system information. When the effective duration expires, the terminal device can only use the public frequency point priority.

Cell Selection/Reselection Rules for Terminal Device
Cell Selection

If the cell selected by the terminal device satisfies the appropriate cell criterion (S criterion), the terminal device can choose to camp on the cell to complete the cell selection.

Cell Reselection:

The target cell for reselection satisfies the appropriate cell criterion and the reselection criterion condition defined based on the absolute frequency point priority, then the terminal device reselects to the corresponding cell that meets the aforementioned conditions, and completes the cell reselection;

The above reselection criteria defined based on absolute frequency point priority (also referred to as absolute frequency cell reselection evaluation criterion) include the following three types:

High priority frequency point cell reselection criterion;
Same-frequency or same-priority frequency point cell reselection criterion, also known as R criterion; and
Low priority frequency point cell reselection criterion.

Introduction to Slicing Concept

Network slicing is a service-oriented resource encapsulation concept. A network slice is uniquely identified by the network slice selection assistant identity (NSSAI), and also corresponds to a type of resource configuration. Different core networks can support different types of network slicing according to requirements. Unlike long term evolution (LTE) system registration, the terminal devices need to register a certain slice before using it in the network. The terminal device can initiate the session establishment process corresponding to the slice only after the slice is successfully registered. During the slice registration process, the NSSAI information (Request NSSAI) requested by the terminal device to register is carried to the access network side through message 5, and the terminal is restricted to register up to 8 S-NSSAI (Single NSSAI) information at a time. The core network generates the Allowed NSSAI and Rejected NSSAI of the terminal device according to the subscription information of the terminal device, the Request NSSAI of the terminal device, the slice information supported locally, and the local policy.

The terminal device will also be pre-configured or obtain the configured NSSAI from the core network. This configuration is unique to the public land mobile network (PLMN). If a PLMN configured for the terminal device is not configured with the configured NSSAI, the default NSSAI information will be used.

The new radio (NR) system core network defines that, one slice corresponds to one S-NSSAI identifier, and an S-NSSAI identifier consists of a slice/service type (SST) and a slice differentiator (SD), wherein the slice/service type SST occupies 8 bits and must appear, and the slice differentiator SD occupies 24 bits and is optional.

In the current NR system, the cell reselection method does not consider the slice information concerned by the terminal device. The terminal device cannot guarantee that the reselected cell supports the slice information concerned by the terminal device. The terminal device may need to re-initiate the cell reselection process or a network device redirection process to initiate the slice concerned service, which causes additional service delays, and is not conducive to terminal device experience.

In view of the above existing problems, this application provides a cell reselection method based on slices. In this solution, when a terminal device performs cell reselection, it first obtains slice-related information associated with the serving cell frequency point and/or slice-related information associated with at least one neighboring cell frequency point, and then cell reselection is performed based on the slice-related information, so as to avoid the need to perform the cell reselection process again due to the fact that the slice is not considered, and reduce the service delay of the terminal device.

FIG. 1 is a schematic diagram of an application scenario of the slice-based cell reselection method provided by the present application. As shown in FIG. 1, the solution is mainly applied to any terminal device. The network device can be used to send some configuration information, or slice-related information, or indicate whether the terminal device adopts the slice-based cell reselection method.

Specifically, the solution may involve network devices and terminal devices. Network devices are devices that communicate with UE terminal devices (or communication terminals, terminals), and may be access network devices or core network devices.

The network device can provide communication coverage for a specific geographical area, and can communicate with the terminal device located in the coverage area. Optionally, the network device may be a base station (Base Transceiver Station, BTS) in a Global System for Mobile Communications (GSM) system or a Code Division Multiple Access (CDMA) system, or a base station (NodeB, NB) in a WCDMA system, or an evolved base station (Evolutional Node B, eNB or eNodeB) in a Long Term Evolution (LTE) system, or a wireless controller in the Cloud Radio Access Network (CRAN), or the network device can be a mobile switching center, relay station, access point, vehicle-mounted device, wearable device, hub, switch, bridge, router, the network side device in the 5G network or the network device in the future evolution of the Public Land Mobile Network (PLMN), or the base station that provides satellite services, etc.

The terminal device includes, but not limited to, a device that is configured to receive/transmit communication signals via a wired connection, such as via a public switched telephone network (PSTN), digital subscriber line (DSL), digital cable, direct cable connection, and/or another data connection/network, and/or via a wireless interface, for example, a cellular network, a wireless local area network (WLAN), a digital television network such as a DVB-H network, a satellite network, an AM/FM broadcast transmitter, and/or another party; and/or an Internet of Things (IoT) device. The terminal device configured to communicate through the wireless interface may be referred to as a "wireless communications terminal", "wireless terminal" or "mobile terminal". Examples of the mobile terminal include, but are not limited to, a satellite or a cellular telephone; a personal communications system (PCS) terminal that may combine a cellular radiotelephone with data processing, facsimile and data communication capabilities; a personal digital assistant (PDA) that can include a radiotelephone, a pager, Internet/Intranet access, a web browser, a notepad, a calendar, and/or a global positioning system (GPS) receiver; and a conventional laptop and/or palmtop receiver or another electronic device that includes a radiotelephone transceiver. It may be an access terminal, a subscriber unit, a subscriber station, a mobile station, a mobile site, a remote station, a remote terminal, a mobile device, a user terminal, a terminal, a wireless communications device, a user agent, a user apparatus, or the like. The access terminal may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal device in a 5G network, a terminal device in a future evolved PLMN or the like.

Based on scenario illustrated in FIG. 1, the slice-based cell reselection method provided by the present application will be described in detail below through several specific embodiments.

Figure 2:
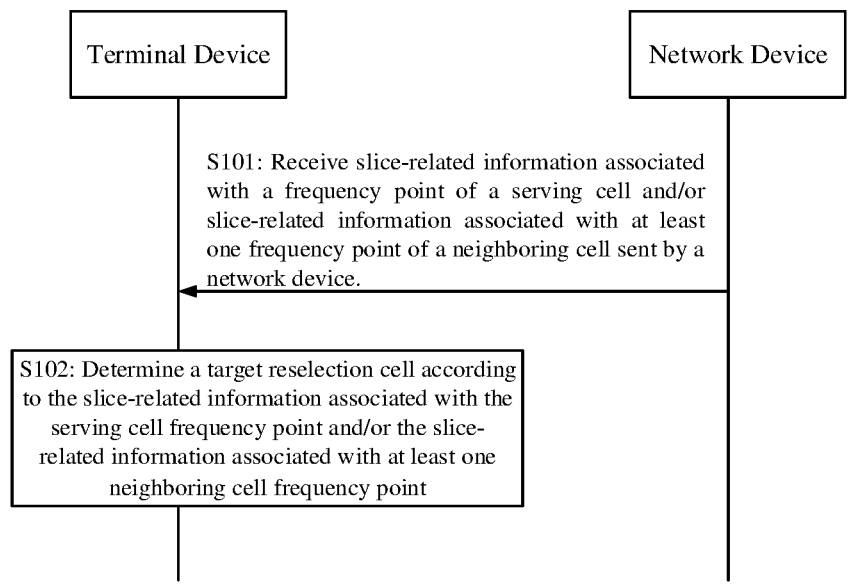
FIG. 2 is a flow chart of embodiment 1 of a slice-based cell reselection method provided by the present application.

FIG. 2 is a flow chart of embodiment 1 of the slice-based cell reselection method provided by the present application. As shown in FIG. 2, the slice-based cell reselection method specifically includes the followings.

S101: Receive slice-related information associated with a frequency point of a serving cell and/or slice-related information associated with at least one frequency point of a neighboring cell sent by a network device.

In this step, the terminal device may obtain slice-related information associated with the frequency point of the current serving cell and/or slice-related information associated with at least one frequency point of the neighboring cell from the network device.

In a specific implementation, the terminal device may acquire the slice-related information associated with the serving cell frequency point and/or the slice-related information associated with the at least one neighboring cell frequency point from the network device through a system broadcast message or dedicated signaling.

Specifically, for any one of the serving cell frequency point or at least one neighboring cell frequency point, the slice-related information associated with the frequency point includes at least slice identity information, and the slice identity information specifically includes at least one slice identity.

Optionally, in a specific implementation, for any frequency point in the serving cell frequency point or at least one neighboring cell frequency point, the slice-related information associated with the frequency point further includes slice priority information associated with at least one slice identity.

Optionally, in another specific implementation, the slice priority information is configured according to a frequency point granularity or a physical cell identity (PCI) granularity.

In a specific implementation, the slice priority information may include slice priorities corresponding to one or more slice identities in the slice identity information. It is possible that the slice priority information includes slice priorities corresponding to all slice identities, or it is also possible that the slice priority information may only include slice priorities corresponding to one or several slice identities in the slice identity information, which is not limited in this solution.

During the cell reselection process of the terminal device, if it is found that one or more slice identities are not configured with slice priority information in the slice-related information associated with any frequency point, the slice priority corresponding to the one or more slice identities not configured with slice priority information may be configured as the highest level or the lowest level.

S102: Determine a target cell for reselection according to the slice-related information associated with the serving cell frequency point and/or the slice-related information associated with at least one neighboring cell frequency point.

In this step, after the terminal device obtains the slice-related information associated with the relevant frequency point, it can perform cell reselection according to the slice-related information associated with the serving cell frequency point and/or the slice-related information associated with at least one neighboring cell frequency point, and finally determine the target reselection cell.

The cell reselection performed by the terminal device based on slice-related information includes multiple implementation methods. The specific reselection methods are described below with examples.

The First Way

In the first round of reselection evaluation, the terminal device may perform, for at least one to-be-evaluated neighboring cell that supports the target slice identity, reselection evaluation sequentially in the order from high to low according to the absolute frequency point priority corresponding to the frequency point of each neighboring cell, to determine a unique target reselection cell.

If the unique target cell for reselection is determined according to the absolute frequency point priority corresponding to the neighboring cell frequency point, then the cell reselection process is ended; otherwise, a second round of reselection evaluation is performed.

In the second round of reselection evaluation, if the unique target reselection cell is not determined according to the absolute frequency point priority corresponding to the neighboring cell frequency point (that is, the first round of reselection evaluation process cannot uniquely determine a target reselection cell), then for at least two neighboring cells with the same absolute frequency point priority corresponding to the neighboring cell frequency point, the cell reselection evaluation is performed sequentially in the order from high to low according to the slice priority corresponding to the target slice identity associated with the neighboring cell frequency point, to determine the unique target reselection cell.

If the unique target cell for reselection is determined according to the slice priority corresponding to the target slice identity associated with the neighboring cell frequency point, then the cell reselection process is ended; otherwise, a third round of reselection evaluation is performed.

In the third round of reselection evaluation, if the unique target reselection cell is not determined according to the slice priority corresponding to the target slice identity associated with the neighboring cell frequency point (that is, the second round of reselection evaluation process cannot uniquely determine a target reselection cell), then for at least two neighboring cells that have the same absolute frequency point priority corresponding to the neighboring cell frequency point and the same priority corresponding to the target slice identity associated with the neighboring cell frequency point, then the cell reselection evaluation is performed according to an absolute frequency point cell reselection evaluation criteria corresponding to the frequency points of the at least two neighboring cells, to determine the unique target reselection cell.

If the unique target reselection cell is selected according to the absolute frequency point cell reselection evaluation criteria, the cell reselection process is ended. If the number of cells selected according to this rule is still two or more, another round of reselection evaluation is needed.

In the fourth round of reselection evaluation, if the number of cells meeting the absolute frequency point cell reselection evaluation criteria is greater than one (that is, there are still at least two cells meeting the absolute frequency point cell reselection evaluation criteria), then the cells are ranked according to the cell reselection criterion for the same-priority frequency point or the same-frequency reselection criterion (also referred to as the R criterion), and the cell with the highest rank is taken as the target reselection cell.

The Second Way

In the first round of reselection evaluation, the terminal device performs, for at least one to-be-evaluated neighboring cell that supports the target slice identity, reselection evaluation sequentially in the order from high to low according to the slice priority corresponding to the target slice identity associated with the neighboring cell frequency point of each neighboring cell, to determine a unique target reselection cell.

If the unique target cell for reselection is determined according to the slice priority corresponding to the target slice identity associated with the neighboring cell frequency point, then the cell reselection process is ended, otherwise, the second round of reselection evaluation process is performed.

In the second round of reselection evaluation, if the unique target reselection cell is not determined according to the slice priority corresponding to the target slice identity associated with the neighboring cell frequency point (that is, the first round of reselection evaluation process cannot uniquely determine a target reselection cell), then for at least two neighboring cells with same priority corresponding to the target slice identity associated with the neighboring cell frequency point, cell reselection evaluation is performed sequentially in the order from high to low according to the absolute frequency point priority corresponding to the neighboring cell frequency point of each neighboring cell, to determine the unique target reselection cell.

If the unique target cell for reselection is determined according to the absolute frequency point priority corresponding to the neighboring cell frequency point, the cell reselection process is ended. Otherwise, the third round of re-election evaluation process is performed.

In the third round of reselection evaluation, if the unique target reselection cell is not determined according to the absolute frequency point priority corresponding to the neighboring cell frequency point (that is, the second round of reselection evaluation process cannot uniquely determine a target reselection cell), then for at least two neighboring cells with same slice priority corresponding to the target slice identity associated with the neighboring cell frequency point and same absolute frequency point priority corresponding to the neighboring cell frequency point, cell reselection evaluation is performed according to an absolute frequency point cell reselection evaluation criteria corresponding to the frequency points of the at least two neighboring cells, to determine the unique target reselection cell.

If there is only one cell that satisfies the absolute frequency point cell reselection evaluation criterion, that is, the target reselection cell is uniquely determined, then the cell reselection process is ended, otherwise, the next round of reselection evaluation process is required.

In the fourth round of reselection evaluation, if the number of cells meeting the absolute frequency point cell reselection evaluation criteria is greater than one (that is, there are still at least two cells meeting the absolute frequency point cell reselection evaluation criteria), then the cells are ranked according to the cell reselection criterion for the same-priority frequency point or the same-frequency reselection criterion (also referred to as the R criterion), and the cell with the highest rank is taken as the target reselection cell.

The Third Way

The terminal device assigns, for at least one to-be-evaluated neighboring cell that supports the target slice identity, a value for an absolute frequency point priority corresponding to the neighboring cell frequency point according to relative magnitude of a slice priority corresponding to the target slice identity associated with the neighboring cell frequency point of each neighboring cell. Cell reselection evaluation is performed sequentially in the order from high to low according to the absolute frequency point priority assigned with the value corresponding to the neighboring cell frequency point of each neighboring cell, to determine a unique target reselection cell.

If the unique target reselection cell is determined according to the absolute frequency point priority assigned with the value corresponding to the neighboring cell frequency point, then the cell reselection evaluation process is ended. Otherwise, cell reselection needs to be performed according to the reselection criteria defined based on the absolute frequency point priority. It can be implemented specifically as:

If the unique target reselection cell is not determined according to the absolute frequency point priority assigned with the value corresponding to the neighboring cell frequency point, then for at least two neighboring cells with same absolute frequency point priority corresponding to the neighboring cell frequency point, cell reselection evaluation is performed according to an absolute frequency point cell reselection evaluation criteria corresponding to the frequency points of the at least two neighboring cells, to determine the unique target reselection cell.

If the number of cells meeting the absolute frequency point cell reselection evaluation criteria is greater than one, then the cells are ranked according to the cell reselection criterion for the same-priority frequency point or the same-frequency reselection criterion (also referred to as the R criterion), and the cell with the highest rank is taken as the target reselection cell.

In the process of cell reselection using the third way, it should be understood that this implementation is substantially to perform cell selection based on the slice priority corresponding to the target slice identity corresponding to each frequency point. While in the implementation process, before performing the cell selection according to the absolute frequency point priority, the absolute frequency point priority corresponding to the respectively neighboring cell frequency point is reassigned with a value according to the relative magnitude of the slice priority corresponding to the target slice identity of the respective neighboring cell frequency point, and each neighboring cell frequency point gets a new absolute frequency point priority.

In the specific implementation of this implementation, for the assigning the value for the absolute frequency point priority corresponding to each neighboring cell frequency point, the original absolute frequency point priority of the frequency point may be directly replaced by the slice priority corresponding to the target slice identity on the frequency point, or the slice priority corresponding to the target slice identity on the frequency point may be sorted or relative priority thereof may be determined, which is not limited in this implementation.

It should be understood that, in any of the above ways, the absolute frequency point cell reselection evaluation criterion includes at least one of the following:
- a High-priority frequency point cell reselection evaluation criterion;
- a Low-priority frequency point cell reselection evaluation criterion; or
- a same-frequency or same-priority frequency point cell reselection evaluation criterion, also referred to as the R criterion.

The above cell reselection schemes are all cell reselection based on slice-related information, which all needs the target slice identity. For a terminal device, it is necessary to determine the target slice identity before particularly applying the target slice identity.

In a specific implementation of this solution, the terminal device can obtain the target slice identity from the access layer (Access Stratum, AS, also referred to as the AS layer), and the target slice identity is directly obtained by the AS layer from the upper layer obtained, or selected by the AS layer from multiple slice identities provided by the upper layer.

Optionally, the upper layer may be a non-access stratum (Non-Access Stratum, NAS), also referred to as the NAS layer.

Specifically, if the target slice identity is one selected by the AS layer from multiple slice identities provided by the upper layer, the terminal device also needs to obtain the slice priority information corresponding to the multiple slice identities from the upper layer, and then determine the target slice identity according to the slice priority information corresponding to the multiple slice identities.

In the slice-based cell reselection method provided in this embodiment, the slice-related information corresponding to frequency point of each cell is obtained from the network device, and then cell reselection is performed based on the slice-related information. That is, the terminal device can perform cell reselection based on preferences and requirements for slices, which avoids reselection due to slice problems, reduces service delays of terminal devices, and improves user experience.

On the basis of the foregoing embodiments, for a terminal device, it needs determine in advance whether to use the slice-based cell reselection method when performing cell reselection. Specifically, the terminal device can determine whether to user the slice-based cell reselection method by at least one of the following ways.

Figure 3:
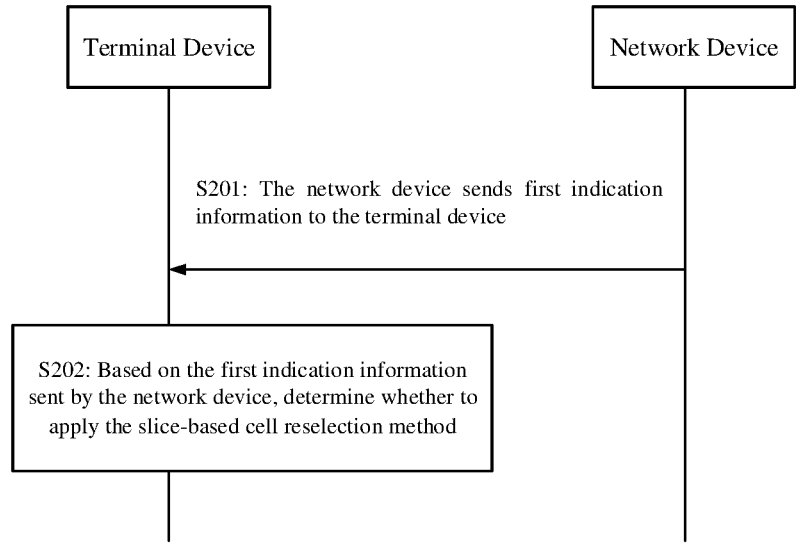
FIG. 3 is a flowchart of an example of a slice-based cell reselection method provided by the present application.

In the first way, FIG. 3 is a flowchart of an example of a slice-based cell reselection method provided by the present application. As shown in FIG. 3, the slice-based cell reselection method further includes the following steps.

S201: The network device sends first indication information to the terminal device.

S202: Based on the first indication information sent by the network device, determine whether to apply the slice-based cell reselection method.

In this implementation, the network device sends the first indication information to the terminal device, and the terminal device receives the first indication information sent by the network device, and then determines whether to apply the slice-based cell reselection method based on the first indication information sent by the network device. The first indication information is used to indicate whether to apply the slice-based cell reselection method.

The first indication information is switch configuration information, that is, it directly indicates whether to apply the slice-based cell reselection method or not to apply the slice-based cell reselection method.

Alternatively, the first indication information is used to indicate whether to apply any one of the slice-based cell reselection methods, and if the first indication information indicates that the terminal device applies a specific slice-based cell reselection method, then the terminal device applies the corresponding slice-based cell reselection method. Otherwise, when the first indication information does not include or the value of the first indication information does not point to any effective slice-based cell reselection method, then the terminal device does not apply the slice-based cell reselection method.

The network device may configure the first indication information to the terminal device through a system broadcast message or a dedicated signaling, which is not limited in this implementation.

Optionally, when the first indication information is carried by a system broadcast message, the system broadcast message may be any one of SIB1, SIB2, SIB3, SIB4, or SIB5.

In the second way, the terminal device may determine whether to apply the slice-based cell reselection method according to its own capability information, wherein the capability information is used to indicate whether to apply the slice-based cell reselection method.

In the third way, based on a pre-configuration agreement, it is determined whether to apply the slice-based cell reselection method. In this implementation, the terminal device may determine to apply or not to apply the slice-based cell reselection method according to the agreement in the protocols or the factory settings.

In the specific implementation of any of the foregoing embodiments, if the terminal device needs to perform cell reselection based on slices, it needs to measure the serving cell and/or at least one neighboring cell to obtain the measurement results, and then perform cell reselection based on the slice-related information.

Generally speaking, the terminal device needs to measure each cell after meeting the cell measurement condition. In this implementation, in order to apply the slice-based cell reselection scheme, a preset even that does not meet the measurement condition but can trigger the cell measurement process is configured.

That is, for the terminal device, the frequency point measurement process of the neighboring cell that does not meet the measurement condition but supports the target slice identity can be triggered according to the preset event; wherein the preset event includes at least one of the following:
(1), determine to apply the slice-based cell reselection method (that is, although the measurement condition is not met, but the terminal device has determined to apply the slice-based cell reselection method, it can actively perform cell measurement);
(2), the terminal device camps on a new cell;
(3), the neighboring cell frequency point supports the target slice identity;
(4), the current serving cell measurement result is less than or equal to a first threshold, and the first threshold is obtained through a system broadcast message or a dedicated signaling; or
(5), the target reselection cell cannot be determined from the to-be-evaluated neighboring cells with existing measurement results, and there are neighboring cell frequency points that do not meet the measurement start condition but support the target slice identity.

Among the aforementioned five preset events, when one event or more than one event occurs, cell measurement can be performed when the measurement condition is not satisfied.

Optionally, the above events may be used in combination, for example: event (3) and event (4) are used in combination, event (4) and event (5) are used in combination, and this application does not limit this combination of events.

It should be understood that events (1) to (4) are all preconditions, that is, before the cell reselection process, if these events occur, cell measurement is performed to obtain measurement results. Then cell reselection is performed based on slice-related information and measurement results. Event (5) is different, it is a post-condition, that is to say, in the process of cell reselection, it is found that the target reselection cell cannot be determined from the to-be-evaluated neighboring cells with existing measurement results, and there are other neighboring cell frequency points that can support the target slice identity, then cell measurement can be performed on these neighboring cells, and cell reselection can be further performed according to the measurement results.

Figure 4:
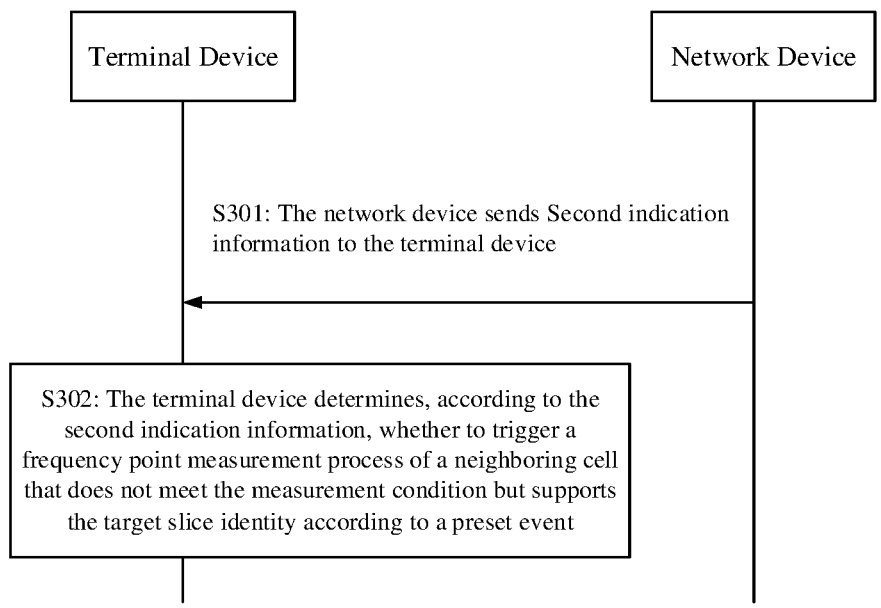
FIG. 4 is a flowchart of another example of a slice-based cell reselection method provided by the present application.

In a specific implementation of this solution, whether to use the aforementioned preset event to trigger cell measurement can be configured by the network device. For example: FIG. 4 is a flowchart of another example of the slice-based cell reselection method provided by the present application. As shown in FIG. 4, the slice-based cell reselection method further includes the following steps:

S301: The network device sends second indication information to the terminal device.

S302: The terminal device determines, according to the second indication information, whether to trigger a frequency point measurement process of a neighboring cell that does not meet the measurement condition but supports the target slice identity according to a preset event.

In this implementation, the terminal device receives the second indication information sent by the network device, and the second indication information is used to indicate the terminal device whether to apply the method of triggering frequency point measurement process of the neighboring cell that does not meet the measurement condition but supports the target slice identity according to the preset event.

It should be understood that, in a specific implementation of this solution, the second indication information is configured through a system broadcast message or a dedicated signaling.

To sum up, in the slice-based cell reselection method provided by this application, the terminal device needs to determine the target slice identity when performing cell reselection, and obtain the associated slice-related information from the network device. On this basis, based on the measurement result of the cell, the slice-related information, and the target slice identities, cell reselection evaluation is performed, to finally determine the target reselection cell, which effectively avoids the problem that the cell selected by the terminal device does not support the slice services concerned by the terminal device, and also avoids re-initiating the cell reselection or redirection process, reduces service delay, and improves user experience.

Based on the foregoing embodiments, the following processes involved in this implementation will be described in detail through specific embodiments.

1. The terminal device determines the target slice identity;
2. Slice-related information associated with the serving cell frequency point and/or at least one neighboring cell frequency point;
3. Specific cell reselection plan;
4. Determine whether to apply the slice-based cell reselection method; and
5. Start the frequency point measurement process of the neighboring cell that does not meet the measurement start condition but supports the target slice identity according to a preset event.

1. The Terminal Device Determines the Target Slice Identity

The target slice identity is directly acquired by the AS layer of the terminal device from the upper layer, or the target slice identity is selected by the AS layer of the terminal device from multiple slice identities provided by the upper layer.

Mode 1: The target slice identity is directly acquired by the AS layer of the terminal device from the upper layer. In this manner, the AS layer of the terminal device directly obtains the target slice identity from the upper layer.

Mode 2: The target slice identity is obtained by the AS layer of the terminal device selecting one of multiple slice identities provided by the upper layer.

In an implementation of the mode 2, the multiple slice identities obtained by the AS layer of the terminal device from the upper layer are not associated with slice priority information. At this time, the terminal device randomly selects one of the multiple slice identities provided by the upper layer as the target slice identity based on the implementation.

In another implementation of the mode 2, the multiple slice identities obtained by the AS layer of the terminal device from the upper layer are associated with slice priority information, as shown in Table 1:

Table 1 Schematic representation of slice priority information associated with multiple slice identities obtained by the AS layer of the terminal device from the upper layer

| Slice identity 1 | Slice identity 2 | . . . | Slice identity N |
|---|---|---|---|
| Slice priority information 1 | Slice priority information 2 | . . . | Slice priority information N |

As shown in Table 1, when the upper layer provides the slice identity information, it also provides the slice priority information associated with the slice identity information. The slice priority information associated with each slice identity information can be the same or different, and it is allowed that some slice identity information provided by the upper layer does not have associated slice priority information. At this time, it is considered that the slice identity slice priority information of these slices without associated slice priority information is the highest or the lowest.

The terminal device selects one of the multiple slice identities provided by the upper layer as the target slice identity according to the slice priority information.

Exemplarily, the aforementioned upper layer may be the NAS layer.

In this application, the meaning of the slice identity: the slice identity can be a slice group identifier representing a set of S-NSSAI/NSSAI or the SST part of the standard S-NSSAI identifier or the SD part of the standard S-NSSAI identifier, identity obtained by algorithm mapping of the standard-based S-NSSAI/NSSAI identifier.

2. Slice-Related Information Associated with the Serving Cell Frequency Point and/or at Least One Neighboring Cell Frequency Point When the terminal device performs cell reselection, it can process the frequency point of at least one neighboring cell that supports the target slice identity to be evaluated as a target frequency point set, the slice-related information supported by each frequency point in the target frequency point set includes at least the slice identity information, and the slice identity information includes at least one slice identity.

Optionally, the slice-related information supported by each frequency point of the target frequency point set further includes slice priority information associated with the at least one slice identity. At this time, the slice priority information may be configured according to a frequency point granularity or a PCI granularity.

Table 2 Slicing priority information configured according to frequency point granularity

| Neighboring cell frequency point 1 | | | Neighboring cell frequency point 2 | | | ... | Neighboring cell frequency N | | |
|---|---|---|---|---|---|---|---|---|---|
| Slice identity 11 | Slice identity 12 | Slice identity 13 | Slice identity 21 | Slice identity 22 | Slice identity 23 | ... | Slice identity N1 | Slice identity N2 | Slice identity N3 |
| Slice priority info. 11 | Slice priority info. 12 | Slice priority info. 13 | Slice priority info. 21 | Slice priority info. 22 | Slice priority info. 23 | ... | Slice priority info. N1 | Slice priority info. N2 | Slice priority info. N3 |

As illustrated in Table 2, it is explained by taking three slice identities associated with each neighboring cell frequency point as an example. This application does not limit the number of slice identities actually associated with each neighboring cell frequency point. At this time, the slice priority of the same slice identity under the same neighboring cell frequency point is unique, so it is considered that the slice priority information is configured according to the granularity of the frequency point.

Table 3 Slicing priority information configured according to PCI granularity

| Neighboring cell frequency point 1 | | | Neighboring cell frequency point 2 | | | ... | Neighboring cell frequency N | | |
|---|---|---|---|---|---|---|---|---|---|
| PCI 11 | PCI 12 | PCI 13 | PCI 21 | PCI 22 | PCI 23 | ... | PCI N1 | PCI N2 | PCI N3 |
| Slice-related info. 11 | Slice-related info. 12 | Slice-related info. 13 | Slice-related info. 21 | Slice-related info. 22 | Slice-related info. 23 | ... | Slice-related info. N1 | Slice-related info. N2 | Slicing related info. N3 |

As illustrated in Table 3, three PCIs are associated with each neighboring cell frequency as an example. This application does not limit the actual number of PCIs associated with each neighboring cell frequency. One PCI is associated with one slice-related information, and the slice-related information includes one or more slice identities and slice priority information associated with the one or more slice identities, and each slice identity is associated with one slice priority information. At this time, the slice priority of the same slice identity in any PCI under the same neighboring cell frequency is unique, but the slice priority of the same slice identity between different PCIs under the same neighboring cell frequency is not necessarily unique, so it is considered that the slice priority information is configured according to the PCI granularity.

Note 1: In both Table 2 and Table 3, it is allowed that some slice identities associated with the neighboring cell frequency point are not configured with corresponding associated slice priority information. At this time, the slice priority corresponding to the slice identities without priority information can be determined as the highest or lowest level.

Note 2: The relevant slice information supported by each frequency point in the target frequency point set is obtained from the network device through a system broadcast message or a dedicated signaling.

Note 3: The process of obtaining slice-related information corresponding to the serving cell frequency point is similar to the process in Table 2 or Table 3, and will not be repeated here.

3. Specific Cell Reselection Plan

According to the embodiment 1, it can be known that there are at least three ways for a terminal device to perform cell reselection based on slices, and the three methods are described below with examples.

Mode 1 corresponds to a special case of the first type in embodiment 1. When the slice-related information associated with each frequency point only includes slice identity information, the following assumptions are given:

the target slice identity of the terminal device is slice identity 1;
the serving cell frequency is F1, the absolute frequency point priority is 4, and the supported slices are {slice identity 1, slice identity 2, slice identity 3};
the neighboring cell frequency point F2, the absolute frequency point priority is 6, and the supported slices are {slice identity 1, slice identity 2, slice identity 3};
the neighboring cell frequency point F3, the absolute frequency point priority is 6, and the supported slices are {slice identity 2, slice identity 3};
the neighboring frequency point F4, the absolute frequency point priority is 2, and the supported slices are {slice identity 1, slice identity 2, slice identity 3}; and
the neighboring cell frequency point F5, the absolute frequency point priority is 5, and the supported slices are {slice identity 1, slice identity 2, slice identity 3}.

Preparatory stage for cell reselection evaluation: when not considering triggering the frequency point measurement process of the neighboring cell that does not meet the measurement start conditions but supports the target slice identity according to the preset event, since F1 is the service frequency point (always measured according to the rule), F2, F3 and F5 are high-priority frequency points (always measured according to the rule), according to the existing technical requirements, the cell reselection evaluation preparation stage can only measure the measurement results of the cells deployed on F1-F3 and F5, and the neighboring cell frequency point F4 is a low-priority frequency point and will not be measured.

The first round of reselection evaluation: according to the order of absolute frequency point priority corresponding to the neighboring cell frequency point of each neighboring cell from high to low, the cell reselection evaluation is performed sequentially. After the first round of reselection evaluation, the cells on the F2 and F3 are evaluated preferentially. Since the unique target cell for reselection cannot be determined, a second round of reselection evaluation is required.

The second round of reselection evaluation: the first round of reselection evaluation process cannot uniquely determine one target reselection cell, then for at least two neighboring cells with the same absolute frequency point priority corresponding to the neighboring cell frequency point, according to the order of the slice priority corresponding to the target slice identity associated with each neighboring frequency point from high to low, the cell reselection evaluation is performed sequentially, to determine the unique target resection cell. Since F3 does not support the target slice identity (slice identity 1), the cell obtained by the measurement on F3 is excluded, and the cell on F2 is left to be evaluated preferentially. Since the absolute frequency point priority corresponding to F2 is high priority, it needs to be evaluated according to the high priority frequency point cell reselection evaluation criteria. When the cell reselection evaluation criterion condition of the level frequency point is selected, the cell is determined as the target reselection cell; otherwise, the cell on F2 is excluded.

After the cell on F2 is excluded, return to the first round of reselection evaluation process, then evaluate the cell on F5, and so on, until the only target cell for reselection is determined, and the cell reselection is completed.

Mode 2 corresponds to the first type in embodiment 1. When the slice-related information associated with each frequency point includes the slice identity information and the slice priority information associated with at least one slice identity, the following assumptions are given:

the target slice identity of the terminal device is slice identity 1;

the frequency of the serving cell is F1, the absolute frequency point priority is 4, and the supported slice information is {{slice identity 1, slice priority 3}, {slice identity 2, slice priority 4}, {slice identity 3, the slice priority is 5}};

the neighboring cell frequency point F2, the absolute frequency point priority is 6, and the supported slice-related information is {{slice identity 1, slice priority 3}, {slice identity 2, slice priority 4}, {slice identity 3, The slice priority is 5}};

the neighboring cell frequency point F3, the absolute frequency point priority is 6, and the supported slice-related information is {{slice identity 1, slice priority 2}, {slice identity 2, slice priority 3}, {slice identity 3, The slice priority is 4}};

the neighboring cell frequency point F4, the absolute frequency point priority is 6, and the supported slice-related information is {{slice identity 2, slice priority is 4}, {slice identity 3, slice priority is 5}}; and the neighboring cell frequency point F5, absolute frequency point priority is 2, supported slice-related information is {{slice identity 1, slice priority is 4}, {slice identity 2, slice priority is 5}, {slice identity 3, slice priority 6}}.

Preparatory stage for cell reselection evaluation: when not considering triggering the frequency point measurement process of the neighboring cell that does not meet the measurement start conditions but supports the target slice identity according to the preset event, since F1 is the service frequency point (always measured according to the rule), F2-F4 are high-priority frequency points (always measured according to the rule), according to the existing technical requirements, the cell reselection evaluation can only measure the measurement results of the cells deployed on F1-F4. F5 is a low priority frequency point, no measurement is performed.

The first round of reselection evaluation: according to the order of absolute frequency point priority corresponding to the neighboring cell frequency point of each neighboring cell from high to low, the cell reselection evaluation is performed sequentially. After the first round of reselection evaluation, the cells on the F2-F4 are evaluated preferentially. Since the unique target cell for reselection cannot be determined, a second round of reselection evaluation is required.

The second round of reselection evaluation: the first round of reselection evaluation does not determine the only target reselection cell, then for at least two neighboring cells with the same absolute frequency point priority corresponding to the neighboring cell frequency point, according to the order of the slice priority corresponding to the target slice identity associated with the neighboring frequency point from high to low, the cell reselection evaluation is performed sequentially, to determine the unique target resection cell. In the evaluation process, the reselection evaluation is performed preferentially when satisfying both of: the frequency point of the cell supports the target slice identity, and the slice priority corresponding to the target slice identity on the frequency point supporting the target slice identity is the highest. Since the slice priority corresponding to the target slice identity on F3 is not the highest, and F4 does not support the target slice identity (slice identity 1), the cells measured on F3 and F4 are excluded in this round, and the cell on F2 is evaluated preferentially. If the only target reselection cell can be determined, then end the cell reselection process, if the only target reselection cell cannot be determined on F2, then a third round of reselection evaluation is required.

The third round of reselection evaluation: for at least two neighboring cells that have the same absolute frequency point priority corresponding to the neighboring cell frequency point and the priority corresponding to the target slice identity associated with the neighboring cell frequency point is also the same, the cell reselection evaluation is performed according to the absolute frequency point cell reselection evaluation criterion corresponding to the at least two neighboring cell frequency point. In this process, since the absolute frequency point priority corresponding to F2 is high priority, it needs to be evaluated according to the high priority frequency point cell reselection evaluation criteria, and the cell that meets the high priority frequency point cell reselection evaluation criteria conditions is determined as the target reselection cell; otherwise, the cell on F2 is excluded.

If it is determined on the F2 frequency point that there are still two or more cells satisfying the cell reselection evaluation criteria of the high-priority frequency point, a fourth round of reselection evaluation is required.

The fourth round of reselection evaluation: the cells on the F2 frequency point is ranked according to the same priority frequency point cell reselection criterion or the same frequency reselection criterion (also referred to R criterion), and the cell with the highest ranking is taken as the target reselection cell.

Since in this example, after the second round of reselection evaluation, only the cell measured on the neighboring cell frequency point F2 remains, if F2 is also excluded during the third round of reselection evaluation, the second round of reselection evaluation will be performed again, and reselection evaluation is performed on the cell measured on the neighboring cell frequency point F3 whose priority corresponding to the target slice identity is the second highest, and repeat the subsequent steps, and so on, until the unique target reselection cell is selected, to complete the cell reselection.

In the cell reselection process shown in mode 2, the general idea is: firstly perform target cell reselection according to the absolute frequency point priority of the neighboring cell, and then further perform cell reselection evaluation according to the slice priority corresponding to the target slice identity associated with the neighboring cell frequency point. Finally, the cell reselection evaluation is further performed by using the absolute frequency point cell reselection evaluation criterion, which belongs to the first type in the embodiment 1.

Mode 3 corresponds to the second type in embodiment 1, when the slice-related information associated with each frequency point includes slice identity information and slice priority information associated with at least one slice identity, the following assumptions are given:
the target slice identity of the terminal device is slice identity 1;
the frequency of the serving cell is F1, the absolute frequency point priority is 4, and the supported slice information is {{slice identity 1, slice priority 3}, {slice identity 2, slice priority 4}, {slice identity 3, the slice priority is 5}};
the neighboring cell frequency point F2, the absolute frequency point priority is 6, and the supported slice-related information is {{slice identity 1, slice priority 4}, {slice identity 2, slice priority 4}, {slice identity 3, The slice priority is 5}};
the neighboring cell frequency point F3, the absolute frequency point priority is 6, and the supported slice-related information is {{slice identity 1, slice priority 2}, {slice identity 2, slice priority 3}, {slice identity 3, The slice priority is 4}};
the neighboring cell frequency point F4, the absolute frequency point priority is 6, and the supported slice-related information is {{slice identity 2, slice priority is 4}, {slice identity 3, slice priority is 5}}; and
the neighboring frequency point F5, absolute frequency point priority is 3, supported slice-related information is {{slice identity 1, slice priority is 4}, {slice identity 2, slice priority is 5}, {slice identity 3, slice priority 6}}.

Cell reselection preparation process: when considering triggering the frequency point measurement process of the neighboring cell that does not meet the measurement start conditions but supports the target slice identity according to the preset event, since F1 is the service frequency point (always measured according to the rule), F2-F4 are high-priority frequency points (always measured according to the rule), and F5, although being a low-priority frequency point, supports target slice identity and can trigger measurement according to preset events. According to the existing technical requirements, the cell reselection evaluation preparation can measure the measurement results of the cells deployed on F1-F5.

The first round of reselection evaluation: according to the order of slice priority corresponding to the target slice identity associated with the neighboring cell frequency point of each neighboring cell from high to low, the cell reselection evaluation is performed sequentially to determine a unique target reselection cell. For at least one neighboring cell that supports the target slice identity, the cell reselection evaluation is performed sequentially in the order of the slice priority from high to low to determine the reselection cell, and after the first round of evaluation, the neighboring cell frequencies F2 and F5 are remained for further evaluation. Specifically, since F4 does not support the target slice identity, and although F3 supports the target slice identity, the slice priority corresponding to the target slice identity is lower than the slice priority in the serving cell, so frequency points F3-F4 are excluded. After the first round of reselection evaluation, the cells on the F2 and F5 are evaluated preferentially. Since the unique target cell for reselection cannot be determined, a second round of reselection evaluation is required.

The second round of reselection evaluation: for at least two neighboring cells with the same priority corresponding to the target slice identity associated with the neighboring cell frequency point, according to the order of the absolute frequency point priority corresponding to the neighboring cell frequency point of each neighboring cell from high to low, the cell reselection evaluation is performed sequentially, to determine the unique target resection cell. Specifically: since the absolute frequency point priority on F5 is 3, which is lower than the absolute frequency point priority 6 on F2, the cells measured on F5 can be temporarily excluded, and the cells on F2 can be evaluated first. If the only target reselection cell can be determined, then end the cell reselection process, if the only target reselection cell cannot be determined on F2, then a third round of reselection evaluation is required.

The third round of cell reselection evaluation: the cell reselection evaluation is performed according to the absolute frequency point cell reselection evaluation criterion corresponding to the at least two neighboring cell frequency point. In this process, since the absolute frequency point priority corresponding to F2 is high priority, it needs to be evaluated according to the high priority frequency point cell reselection evaluation criteria, and the cell that meets the high priority frequency point cell reselection evaluation criteria conditions is determined as the target reselection cell; otherwise, the cell on F2 is excluded.

If it is determined on the F2 frequency point that there are still two or more cells satisfying the cell reselection evaluation criteria of the high-priority frequency point, a fourth round of reselection evaluation is required.

The fourth round of reselection evaluation: the cells on the F2 frequency point is ranked according to the same priority frequency point cell reselection criterion or the same frequency reselection criterion (also referred to R criterion), and the cell with the highest ranking is taken as the target reselection cell.

Since in this example, after the second round of reselection evaluation, only the cell measured on the frequency point F2 remains, if F2 is also excluded during the third round of reselection evaluation, the second round of reselection evaluation will be performed again, and reselection evaluation is performed on the cell measured on F5 with a lower absolute frequency point priority, and repeat the subsequent steps, and so on, until the unique target reselection cell is selected, to complete the cell reselection.

In the cell reselection process shown in mode 3, the general idea is: firstly, perform cell reselection evaluation sequentially according to the slice priority order corresponding to the target slice identity associated with the neighboring cell frequency point, and then further according to the absolute frequency point priority of the neighboring cell frequency point is used to perform target cell reselection, and finally the absolute frequency point cell reselection evaluation criterion is used to further perform cell reselection evaluation, which belongs to the second type in the embodiment 1.

Mode 4 corresponds to the third type in embodiment 1. When the slice-related information associated with each frequency point includes slice identity information and slice priority information associated with at least one slice identity, the following assumptions are given:

the target slice identity of the terminal device is slice identity 1;
the frequency of the serving cell is F1, the absolute frequency point priority is 3, and the supported slice information is {{slice identity 1, slice priority 3}, {slice identity 2, slice priority 4}, {slice identity 3, the slice priority is 5}};
the neighboring cell frequency point F2, the absolute frequency point priority is 6, and the supported slice-related information is {{slice identity 1, slice priority 4}, {slice identity 2, slice priority 4}, {slice identity 3, The slice priority is 5}};
the neighboring cell frequency point F3, the absolute frequency point priority is 6, and the supported slice-related information is {{slice identity 1, slice priority 2}, {slice identity 2, slice priority 3}, {slice identity 3, The slice priority is 4}}; and
the neighboring cell frequency point F4, the absolute frequency point priority is 6, and the supported slice-related information is {{slice identity 1, slice priority is 3}, {slice identity 2, slice priority is 5}}.

Preparatory stage for cell reselection evaluation: when not considering triggering the frequency point measurement process of the neighboring cell that does not meet the measurement start conditions but supports the target slice identity according to the preset event, since F1 is the service frequency point (always measured according to the rule), F2-F4 are high-priority frequency points (always measured according to the rule). The measurement results of the cells deployed on F1-F4 can be measured in the cell reselection evaluation. The current absolute frequency point priorities of F2-F4 are the same, or they can be different, which is not limited in the implementation.

This implementation is different from the implementations of the previous examples, and can be divided into two steps from the implementation steps: assign a value to the absolute frequency point priority according to the slice priority corresponding to the target slice identity, and perform the cell reselection according to the absolute frequency point priority assigned with the value.

Reselection evaluation step 1: for F1-F4 that support the target slice identity, assign a value to the absolute frequency point priority corresponding to the serving cell frequency point and/or the neighboring cell frequency point, according to the magnitude of the slice priority corresponding to the target slice identity associated with the serving cell frequency point and/or the neighboring cell frequency point.

The absolute frequency point priority of F1-F4 after assigning the value is as follows:
the serving cell frequency F1, the absolute frequency point priority is 3.
the neighboring cell frequency point F2, the absolute frequency point priority is 4;
the neighboring cell frequency point F3, the absolute frequency point priority is 2;
the neighboring cell frequency F4, the absolute frequency point priority is 3.

Alternatively, instead of directly assigning a value, the relative level of the absolute frequency point priority after assigning the value is obtained. After assigning the value: the absolute frequency point priority of the neighboring cell frequency point F2>the absolute frequency point priority of the neighboring cell frequency point F4=the absolute frequency point priority of the serving cell frequency point F1>the absolute frequency point priority of neighboring cell frequency point F3.

In the second reselection evaluation step, the cell reselection evaluation is performed sequentially in the order from high to low according to the absolute frequency point priority corresponding to the neighboring cell frequency point of each neighboring cell with the assigned value, to determine the unique target cell for reselection.

When determining the target reselection cell sequentially based on the order of the assigned absolute frequency point priority from high to low, at least one round of cell reselection evaluation is required, as follows.

In the first round of reselection evaluation, the assigned absolute frequency point priority of F3 and F4 is lower than the assigned absolute frequency point priority of F2, so the cells on the frequency points of F3 and F4 are excluded. The cell on the F2 frequency point with the highest assigned absolute frequency point priority is evaluated firstly.

In this process, since the absolute frequency point priority corresponding to F2 is high priority, it needs to be evaluated according to the high priority frequency point cell reselection evaluation criterion, and when the cell meets the high priority frequency point cell reselection evaluation criterion condition, the cell is determined as the target reselection cell; otherwise, the cell on F2 is excluded.

If it is determined on the F2 frequency point that there are still two or more cells satisfying the cell reselection evaluation criteria of the high-priority frequency point, a second round of reselection evaluation is required.

The second round of reselection evaluation: Rank the cells on the F2 frequency point according to the same priority frequency point cell reselection criteria or the same frequency reselection criteria (also referred to as R criteria), and determine the cell with the highest ranking as the target reselection cell.

Since in this example after the first round of the second step, the reselection evaluation is performed preferentially on the cell measured on the neighboring cell frequency point F2, if the unique target reselection cell cannot be determined on F2, then first round of the second step of the reselection evaluation process can be repeated, to perform reselection evaluation on the cell measured on the neighboring cell frequency point F4 whose assigned absolute frequency point priority is the second highest, the subsequent steps are repeated, and so on, until the unique target reselection cell is selected, to complete the cell reselection.

In the cell reselection process shown in mode 4, the general idea is: first reassign the value of the absolute frequency point priority of the neighboring cell frequency point according to the slice priority that supports the target slice identity, and then after the assignment, the target cell resection is performed on according to the absolute frequency point priority of the neighboring cell frequency point, and finally further cell reselection evaluation is performed by using the absolute frequency point cell reselection evaluation criterion, which belongs to the third type in the embodiment 1.

4. Determine Whether to Apply the Slice-Based Cell Reselection Method (this Process is an Optional Process)

For the slice-based cell reselection method provided in any of the foregoing embodiments, the terminal device first needs to determine whether to apply the slice-based cell reselection method. Specifically, at least one of the following methods can be used for determination.

Determine whether to apply the slice-based cell reselection method based on first indication information sent by the network device, wherein the first indication information is used to indicate whether to apply the slice-based cell reselection method.

Determine whether to apply the slice-based cell reselection method according to capability information of the terminal device, wherein the capability information is used to indicate whether to apply the slice-based cell reselection method.

Determine whether to apply the slice-based cell reselection method based on the pre-configuration agreement.

In the embodiment, when the terminal device determines whether to apply the slice-based cell reselection method based on the first indication information, the first indication information may be configured through a system broadcast message or a dedicated signaling.

Based on the pre-configuration agreement means determining according to the default protocol, that is, the network device does not need to provide explicit configuration information to the terminal device.

5. Trigger Measurement Process of the Neighboring Cell Frequency Point that do not Meet the Measurement Start Conditions but Support the Target Slice Identity According to Preset Events (this Process is an Optional Process)

The terminal device may trigger the measurement process of the neighboring cell frequency point that does not meet the measurement start condition but supports the target slice identity according to a preset event, and the preset event includes at least one of the following events:
  determining to apply the slice-based cell reselection method;
  the terminal device camping on a new cell;
  the target slice identity being supported on neighboring cell frequency point;
  the current serving cell measurement result being less than or equal to a first threshold which is obtained through a system broadcast message or a dedicated signaling; and
  unable to determine the target reselection cell from the to-be-evaluated neighboring cells with existing measurement results, and there existing neighboring cell frequency points that do not meet the measurement start conditions but support the target slice identity.

In a specific implementation, an instruction of the network device can be used to determine whether to use the preset event to trigger the neighbor cell measurement when the measurement condition is met. Specifically, the network device may send second indication information to the terminal device, and the terminal device receives the second indication information sent by the network device, wherein the second indication information is used to indicate the terminal device whether to apply the method of triggering, according to the preset event, the measurement process of the neighboring cell frequency point that does not meet a measurement condition while supports the target slice identity, wherein the second indication information is configured through a system broadcast message or a dedicated signaling.

Based on the above-mentioned embodiments, the present application provides a slice-based cell reselection method. Through this method, a terminal device can perform cell reselection based on its own slice preferences and requirements, which reduces terminal service delay and improves user experience.

Figure 5:
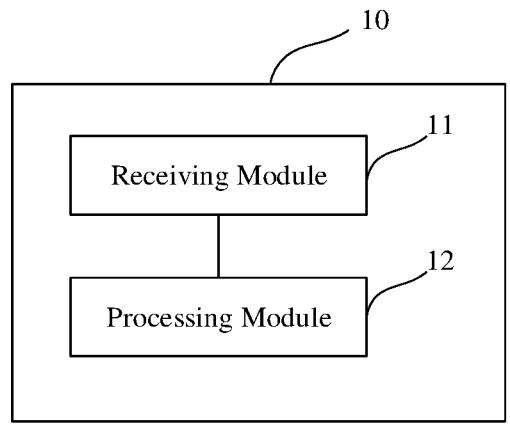
FIG. 5 is a schematic structural diagram of embodiment 1 of an apparatus for slice-based cell reselection provided by the present application.

FIG. 5 is a schematic structural diagram of embodiment 1 of a slice-based cell reselection apparatus provided by the present application. As shown in FIG. 5, the slice-based cell reselection apparatus 10 includes:
  a receiving module 11, configured to receive slice-related information associated with a serving cell frequency point and/or slice-related information associated with at least one neighboring cell frequency point sent by a network device; and
  a processing module 12, configured to determine a target cell for reselection according to the slice-related information associated with the serving cell frequency point and/or the slice-related information associated with the at least one neighboring cell frequency point.

The slice-based cell reselection apparatus provided in this embodiment is used to implement the technical solutions on the terminal device side in the foregoing method embodiments. Its implementation principle and technical effect are similar. The slice-related information is considered when performing cell reselection, to reduce the service delay of terminal device and improve user experience.

In a specific implementation of the slice-based cell reselection apparatus 10, the processing module 12 is further configured to:
  for at least one neighboring cell that supports a target slice identity to be evaluated, perform cell reselection evaluation sequentially in the order from high to low according to an absolute frequency point priority corresponding to the neighboring cell frequency point of each neighboring cell, to determine a unique target reselection cell;
  if the unique target reselection cell is not determined according to the absolute frequency point priority corresponding to the neighboring cell frequency point, for at least two neighboring cells with same absolute frequency point priority corresponding to the neighboring cell frequency point, perform cell reselection evaluation sequentially in the order from high to low according to a slice priority corresponding to the target slice identity associated with the neighboring cell frequency point, to determine the unique target reselection cell;
  if the unique target reselection cell is not determined according to the slice priority corresponding to the target slice identity associated with the neighboring cell frequency point, for at least two neighboring cells with same absolute frequency point priority corresponding to the neighboring cell frequency point and same slice priority corresponding to the target slice identity associated with the neighboring cell frequency point, perform cell reselection evaluation according to an absolute frequency point cell reselection evaluation criteria corresponding to the frequency points of the at least two neighboring cells, to determine the unique target reselection cell; and if a number of cells satisfying the absolute frequency point cell reselection evaluation criterion is more than one, rank the cells according to the R criterion, and take the cell with highest rank as the target reselection cell.

Optionally, in another specific implementation of the slice-based cell reselection apparatus 10, the processing module 12 is further configured to:

for at least one neighboring cell that supports a target slice identity to be evaluated, perform cell reselection evaluation sequentially in the order from high to low according to a slice priority corresponding to the target slice identity associated with the neighboring cell frequency point of each neighboring cell, to determine a unique target reselection cell;

if the unique target reselection cell is not determined according to the slice priority corresponding to the target slice identity associated with the neighboring cell frequency point, for at least two neighboring cells with same priority corresponding to the target slice identity associated with the neighboring cell frequency point, perform cell reselection evaluation sequentially in the order from high to low according to an absolute frequency point priority corresponding to the neighboring cell frequency point of each neighboring cell, to determine the unique target reselection cell;

if the unique target reselection cell is not determined according to the absolute frequency point priority corresponding to the neighboring cell frequency point, for at least two neighboring cells with same slice priority corresponding to the target slice identity associated with the neighboring cell frequency point and same absolute frequency point priority corresponding to the neighboring cell frequency point, perform cell reselection evaluation according to an absolute frequency point cell reselection evaluation criteria corresponding to the frequency points of the at least two neighboring cells, to determine the unique target reselection cell; and if a number of cells satisfying the absolute frequency point cell reselection evaluation criterion is more than one, rank the cells according to the R criterion, and take the cell with highest rank as the target reselection cell.

Optionally, in another specific implementation of the slice-based cell reselection apparatus 10, the processing module 12 is further configured to:

for at least one neighboring cell that supports a target slice identity to be evaluated, assign a value for an absolute frequency point priority corresponding to the neighboring cell frequency point according to relative magnitude of a slice priority corresponding to the target slice identity associated with the neighboring cell frequency point of each neighboring cell;

perform cell reselection evaluation sequentially in the order from high to low according to the absolute frequency point priority assigned with the value corresponding to the neighboring cell frequency point of each neighboring cell, to determine a unique target reselection cell;

if the unique target reselection cell is not determined according to the absolute frequency point priority assigned with the value corresponding to the neighboring cell frequency point, for at least two neighboring cells with same absolute frequency point priority corresponding to the neighboring cell frequency point, perform cell reselection evaluation according to an absolute frequency point cell reselection evaluation criteria corresponding to the frequency points of the at least two neighboring cells, to determine the unique target reselection cell; and if a number of cells satisfying the absolute frequency point cell reselection evaluation criterion is more than one, rank the cells according to the R criterion, and take the cell with highest rank as the target reselection cell.

Optionally, in another specific implementation of the slice-based cell reselection apparatus 10, the processing module 12 is further configured to:

obtain the target slice identity, wherein the target slice identity is obtained directly by the AS layer from upper layer or selected from a plurality of slice identities provided by the upper layer.

Optionally, if the target slice identity is selected by the AS layer from the plurality of slice identities provided by the upper layer, the processing module 12 is further configured to:

obtain slice priority information corresponding to the plurality of slice identities from the upper layer; and determine the target slice identity according to the slice priority information corresponding to the plurality of slice identities.

Optionally, the upper layer is a NAS.

Optionally, the slice-related information associated with any frequency point of the serving cell frequency point and/or the at least one neighboring cell frequency point includes slice identity information, and the slice identity information includes at least one slice identity.

Optionally, the slice-related information associated with any frequency point of the serving cell frequency point and/or the at least one neighboring cell frequency point further includes slice priority information associated with the at least one slice identity.

Optionally, the slice priority information is configured according to a frequency point granularity or a PCI granularity.

Optionally, if the slice-related information associated with any frequency point includes one or more slice identities not configured with slice priority information, the slice priority corresponding to the one or more slice identities not configured with slice priority information is configured as highest or lowest level.

Optionally, the slice-related information associated with the serving cell frequency point and/or the slice-related information associated with the at least one neighboring cell frequency point is obtained through a system broadcast message or a dedicated signaling.

Optionally, the absolute frequency point cell reselection evaluation criterion includes at least one of:

a high-priority frequency point cell reselection evaluation criterion;

a low-priority frequency point cell reselection evaluation criterion; or a same-frequency or same-priority frequency point cell reselection evaluation criterion.

Optionally, the processing module 12 is further configured to:

determine whether to apply a slice-based cell reselection method.

Optionally, the processing module 12 determining whether to apply the slice-based cell reselection method includes at least one of:

determining whether to apply the slice-based cell reselection method based on first indication information sent by the network device, wherein the first indication information is used to indicate whether to apply the slice-based cell reselection method;

determining whether to apply the slice-based cell reselection method according to capability information of the slice-based cell resection apparatus, wherein the capability information is used to indicate whether to apply the slice-based cell reselection method; and determining whether to apply the slice-based cell reselection method according to pre-configuration agreement.

Optionally, the first indication information is a kind of switch configuration information; or, the first indication information is configured to indicate to determine whether to apply any one of the slice-based cell reselection method.

Optionally, the first indication information is configured through a system broadcast message or a dedicated signaling.

Optionally, the processing module 12 is further configured to:

trigger, according to a preset event, a measurement process of the neighboring cell frequency point that does not meet a measurement condition while supports the target slice identity; wherein the preset event includes at least one of:

determining to apply the slice-based cell reselection method;

the terminal device camping on a new cell;

the target slice identity being supported on the neighboring cell frequency point;

measurement result of the current serving cell being less than or equal to a first threshold, wherein the first threshold is obtained through a system broadcast message or a dedicated signaling; or the target reselection cell being not determinable from neighboring cells to be evaluated with existing measurement results, and there existing a neighboring cell frequency point that does not meet the measurement start condition while supports the target slice identity.

Optionally, the receiving module 11 is further configured to:

receive second indication information sent by the network device, wherein the second indication information is configured to indicate the terminal device whether to apply the method of triggering, according to the preset event, the measurement process of the neighboring cell frequency point that does not meet the measurement condition while supports the target slice identity.

Optionally, the second indication information is configured through a system broadcast message or a dedicated signaling.

The slice-based cell reselection apparatus provided in the foregoing embodiments is used to implement the technical solution on the terminal device side in the foregoing method embodiments, and its implementation principles and technical effects are similar, and will not be repeated here.

Figure 6:
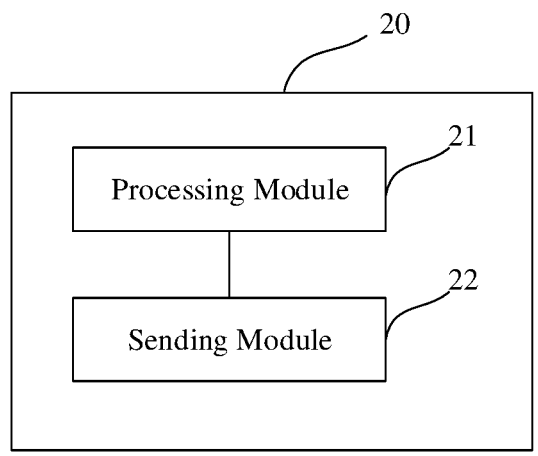
FIG. 6 is a schematic structural diagram of embodiment 2 of an apparatus for slice-based cell reselection provided by the present application.

FIG. 6 is a schematic structural diagram of embodiment 2 of a slice-based cell reselection apparatus provided by the present application. As shown in FIG. 6, the slice-based cell reselection apparatus 20 includes: a processing module 21 and a sending module 22.

The processing module 21 is configured to obtain related information and perform related configuration.

The sending module 22 is configured to send to a terminal device, slice-related information associated with a serving cell frequency point and/or slice-related information associated with at least one neighboring cell frequency point.

Optionally, the slice-related information associated with any frequency point of the serving cell frequency point and/or the at least one neighboring cell frequency point includes slice identity information, and the slice identity information includes at least one slice identity.

Optionally, the slice-related information associated with any frequency point of the serving cell frequency point and/or the at least one neighboring cell frequency point further includes slice priority information associated with the at least one slice identity.

Optionally, the slice priority information is configured according to a frequency point granularity or a physical cell identity (PCI) granularity.

Optionally, if the slice-related information associated with any frequency point includes one or more slice identities not configured with slice priority information, the slice priority corresponding to the one or more slice identities not configured with slice priority information is configured as highest or lowest level.

Optionally, the slice-related information associated with the serving cell frequency point and/or the slice-related information associated with the at least one neighboring cell frequency point is sent through a system broadcast message or a dedicated signaling.

Optionally, the sending module 22 is further configured to:

send first indication information to the terminal device, wherein the first indication information is configured to indicate the terminal device whether to apply the slice-based cell reselection apparatus.

Optionally, the first indication information is a kind of switch configuration information; or, the first indication information is configured to indicate to determine whether to apply any one of the slice-based cell reselection method.

Optionally, the first indication information is configured through a system broadcast message or a dedicated signaling.

Optionally, the sending module 22 is further configured to:

send second indication information to the terminal device, wherein the second indication information is configured to indicate the terminal device whether to apply the method of triggering, according to a preset event, a measurement process of the neighboring cell frequency point that does not meet a measurement condition while supports the target slice identity.

Optionally, the second indication information is configured through a system broadcast message or a dedicated signaling.

The slice-based cell reselection apparatus provided in the foregoing embodiments is used to implement the technical solutions on the network device side in the foregoing method embodiments, and its implementation principles and technical effects are similar, and will not be repeated here.

Figure 7:
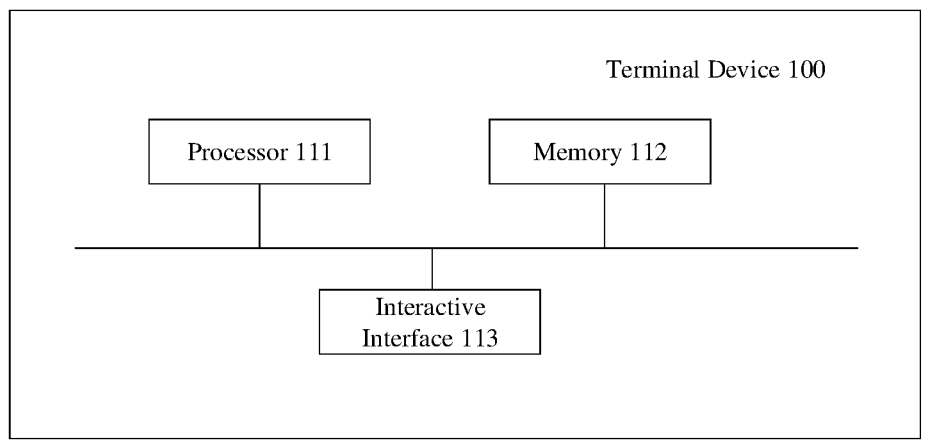
FIG. 7 is a schematic structural diagram of an embodiment of a terminal device provided by the present application.

FIG. 7 is a schematic structural diagram of an embodiment of a terminal device provided by the present application. As shown in FIG. 7, the terminal device 100 includes:

a processor 111, a memory 112, and an interactive interface 113;

wherein the memory 112 stores computer-executable instructions; and the processor 111 executes the computer-executed instructions stored in the memory 112, to cause the processor 111 to execute the slice-based cell reselection method in the foregoing embodiments.

Figure 8:
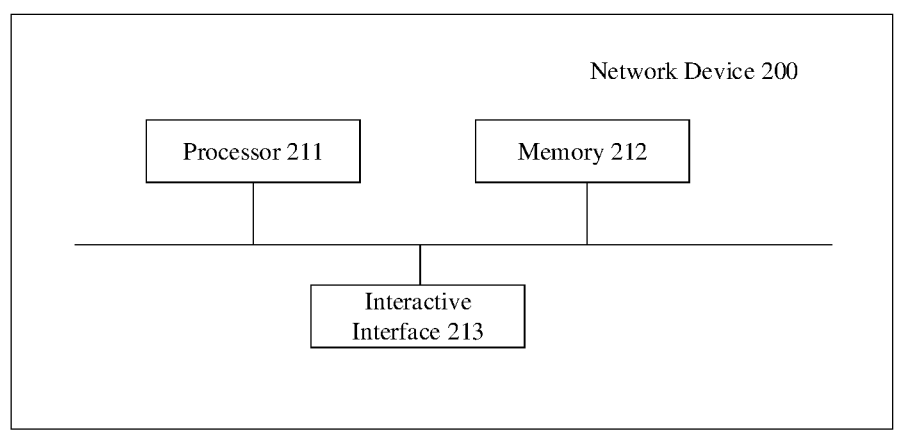
FIG. 8 is a schematic structural diagram of an embodiment of a network device provided by the present application.

FIG. 8 is a schematic structural diagram of an embodiment of a network device provided by the present application. As shown in FIG. 8, the network device 200 includes:

a processor 211, a memory 212, and an interactive interface 213;

wherein the memory 212 stores computer-executable instructions; and the processor 211 executes the computer-executed instructions stored in the memory 212, to cause the processor 211 to execute the slice-based cell reselection method in the foregoing embodiments.

In the foregoing embodiments, the terminal device or network device is a simple design. The embodiments of the present application do not limit the number of processors and memories in the device, and the foregoing embodiments only use the number 1 as an example for illustration.

In a specific implementation of the above-mentioned terminal device or network device, the memory, the processor, and the interactive interface may be connected through a bus or in other ways.

Optionally, the memory may be integrated inside the processor, or may be a memory provided outside the processor.

In addition, the terminal device or network device provided in this application also includes other devices such as communication interfaces, which is not limited in this implementation.

An embodiment of the present application also provides a computer-readable storage medium, wherein computer-executable instructions are stored in the computer-readable storage medium, and when the computer-executable instructions are executed by a processor, the technical solution of the terminal device side in any of the foregoing method embodiments is implemented.

An embodiment of the present application also provides a computer-readable storage medium, wherein computer-executable instructions are stored in the computer-readable storage medium, and when the computer-executable instructions are executed by a processor, the technical solution of the network device side in any of the foregoing method embodiments is implemented.

Optionally, the above-mentioned processor may be a chip.

An embodiment of the present application further provides a chip, including: a processing module and a communication interface, wherein the processing module is configured to implement the solution of the terminal device in any one of the foregoing method embodiments.

An embodiment of the present application further provides a chip, including: a processing module and a communication interface, where the processing module is configured to implement the solution of the network device in any one of the foregoing method embodiments.

Further, any of the above-mentioned chips further includes a storage module (such as a memory), the storage module is used to store instructions, and the processing module is used to execute the instructions stored in the storage module, and the execution of the instructions stored in the storage module causes the processing module to execute the solution in any one of the foregoing method embodiments.

An embodiment of the present application further provides a computer program product, including a computer program, and when the computer program is executed by a processor, implements the slice-based cell reselection method at the terminal device side in any of the foregoing method embodiments.

An embodiment of the present application further provides a computer program product, including a computer program, and when the computer program is executed by a processor, implements the slice-based cell reselection method at the network device side in any of the foregoing method embodiments.

An embodiment of the present application further provides a program, which is used to implement the solution on the terminal device side in any of the foregoing method embodiments when the program is executed by a processor.

An embodiment of the present application further provides a program, which is used to implement the solution on the network device side in any of the foregoing method embodiments when the program is executed by a processor.

In the several embodiments provided in this application, it should be understood that the disclosed devices and methods may be implemented in other ways. For example, the device embodiments described above are only illustrative. For example, the division of the modules is only a logical function division. In actual implementation, there may be other division methods, for example, multiple modules can be combined or integrated to another system, or some features may be ignored, or not implemented. In another point, the mutual coupling or direct coupling or communication connection shown or discussed may be through some interfaces, and the indirect coupling or communication connection of modules may be in electrical, mechanical or other forms.

In the specific implementation of any of the above devices, it should be understood that the processor may be a central processing unit (CPU), and may also be other general-purpose processors, digital signal processors (DSP), application specific integrated circuit (ASIC) and so on. A general-purpose processor may be a microprocessor, or the processor may be any conventional processor, or the like. The steps of the methods disclosed in this application can be directly implemented by a hardware processor, or implemented by a combination of hardware and software modules in the processor.

All or part of the steps for implementing the above method embodiments can be completed by program instructions and related hardware. The aforementioned program can be stored in a readable memory. When the program is executed, it executes the steps including the above-mentioned method embodiments; and the aforementioned memory (storage medium) includes: read-only memory (ROM), RAM, flash memory, hard disk, solid state drive, magnetic tape, floppy disk, optical disc and any combination thereof.

What is claimed is:

1. A method of slice-based cell reselection of a terminal device, comprising:
    receiving one or more of slice-related information associated with a serving cell frequency point or slice-related information associated with at least one neighboring cell frequency point sent by a network device, wherein the one or more of the slice-related information associated with the serving cell frequency point or the slice-related information associated with the at least one neighboring cell frequency point is obtained through a system broadcast message; and determining a target cell for reselection according to the one or more of the slice-related information associated with the serving cell frequency point or the slice-related information associated with the at least one neighboring cell frequency point, wherein the one or more of the slice-related information associated with the serving cell frequency point or the slice-related information associated with the at least one neighboring cell frequency point comprises slice identity information, and the slice identity information comprises at least one slice identity, wherein the one or more of the slice-related information associated with the serving cell frequency point or the slice-related information associated with the at least one neighboring cell frequency point further comprises slice priority information associated with the at least one slice identity, and wherein if the one or more of the slice-related information associated with any frequency point comprises the one or more slice identities not configured with slice priority information, the slice priority information corresponding to the one or more slice identities not configured with slice priority information is configured as a lowest level, and wherein before receiving the one or more of slice-related information, the method further comprises determining whether to perform receiving the one or more of slice-related information according to capability information of the terminal device, the capability information being used to indicate whether to apply the slice-based cell reselection.

2. The method of claim 1, further comprising:
obtaining a target slice identity,
wherein the target slice identity is obtained directly by an access layer from an upper layer or selected from a plurality of slice identities provided by the upper layer.

3. The method of claim 2, wherein the upper layer is a non-access layer (NAS).

4. The method of claim 1, wherein the slice priority information is configured according to a frequency point granularity or a physical cell identity (PCI) granularity.

5. A terminal device, comprising:
a processor, and
a memory storing instructions, which when executed by the processor, cause the processor to:
receive one or more of slice-related information associated with a serving cell frequency point or slice-related information associated with at least one neighboring cell frequency point sent by a network device, wherein the one or more of the slice-related information associated with the serving cell frequency point or the slice-related information associated with the at least one neighboring cell frequency point is obtained through a system broadcast message; and
determine a target cell for reselection according to the one or more of the slice-related information associated with the serving cell frequency point or the slice-related information associated with the at least one neighboring cell frequency point, wherein the one or more of the slice-related information associated with the serving cell frequency point or the slice-related information associated with the at least one neighboring cell frequency point comprises slice identity information, and the slice identity information comprises at least one slice identity, wherein the one or more of the slice-related information associated with the serving cell frequency point or the slice-related information associated with the at least one neighboring cell frequency point further comprises slice priority information associated with the at least one slice identity, wherein if the one or more of the slice-related information associated with any frequency point comprises the one or more slice identities not configured with slice priority information, the slice priority information corresponding to the one or more slice identities not configured with slice priority information is configured as a lowest level, and wherein the processor is further configured to: before receiving the one or more of slice-related information, determine whether to perform receiving the one or more of slice-related information according to capability information of the terminal device, the capability information being used to indicate whether to apply the slice-based cell reselection.

* * * * *